(12) United States Patent
Albrecht

(10) Patent No.: US 11,496,574 B2
(45) Date of Patent: Nov. 8, 2022

(54) METHOD FOR SETTING UP AN UNINTERRUPTED COMMUNICATION CONNECTION AND COMMUNICATION DEVICE

(71) Applicant: Siemens Aktiengesellschaft, Munich (DE)

(72) Inventor: Harald Albrecht, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 299 days.

(21) Appl. No.: 14/994,380

(22) Filed: Jan. 13, 2016

(65) Prior Publication Data
US 2016/0226980 A1    Aug. 4, 2016

(30) Foreign Application Priority Data
Jan. 29, 2015    (EP) .................................. 15153033

(51) Int. Cl.
| | | |
|---|---|---|
| *G06F 15/16* | (2006.01) | |
| *H04L 67/141* | (2022.01) | |
| *H04L 69/16* | (2022.01) | |
| *G05B 19/418* | (2006.01) | |
| *G05B 19/042* | (2006.01) | |

(Continued)

(52) U.S. Cl.
CPC .......... *H04L 67/141* (2013.01); *G05B 19/042* (2013.01); *G05B 19/4185* (2013.01); *H04L 61/4511* (2022.05); *H04L 69/16* (2013.01); *G05B 2219/31186* (2013.01); *H04L 2101/659* (2022.05); *Y02P 90/02* (2015.11)

(58) Field of Classification Search
CPC ... H04L 67/141; H04L 61/4511; H04L 69/16; H04L 2101/659
See application file for complete search history.

(56) References Cited

U.S. PATENT DOCUMENTS 5,991,301 A    11/1999    Christie
2003/0177236 A1*    9/2003    Goto ................. H04L 29/12009
                                                            709/225

(Continued)

FOREIGN PATENT DOCUMENTS

| AU | 7133700 | 1/2002 |
|---|---|---|
| EP | 1307823 | 5/2003 |

(Continued)

OTHER PUBLICATIONS

Office Action dated Sep. 25, 2019 issued in India Patent Application No. 201634001194.

*Primary Examiner* — Padma Mundur
(74) *Attorney, Agent, or Firm* — Cozen O'Connor

(57) ABSTRACT

A method in which a monitoring unit allocated to a communication device checks, based on a name resolution protocol, whether a second communication network address allocated to the first communication device becomes valid in order to set up an uninterrupted communication connection to the communication device that is allocated to an industrial automation system, where in cases of an allocation of a new valid communication network address and an existing communication connection, the monitoring unit initiates a set-up of an additional communication connection using the new communication network address.

16 Claims, 2 Drawing Sheets

(51) Int. Cl.
*H04L 61/4511* (2022.01)
*H04L 101/659* (2022.01)

(56) References Cited

U.S. PATENT DOCUMENTS

| | | |
|---|---|---|
| 2007/0073850 A1 | 3/2007 | Callaghan et al. |
| 2007/0239867 A1 | 10/2007 | Belimpasakis et al. |
| 2008/0310323 A1 | 12/2008 | Shirota et al. |
| 2010/0235614 A1 | 9/2010 | Callaghan et al. |
| 2012/0030751 A1* | 2/2012 | Datta .................. H04L 63/0428 726/15 |
| 2015/0372823 A1* | 12/2015 | Schmirler ............. H04L 9/3263 713/156 |
| 2016/0183129 A1* | 6/2016 | Liu ....................... H04W 76/15 370/331 |

FOREIGN PATENT DOCUMENTS

| | | |
|---|---|---|
| EP | 1 770 458 A2 | 4/2007 |
| RU | 2144208 | 1/2000 |
| RU | 2411682 | 5/2010 |
| RU | 2491756 | 8/2013 |
| WO | WO 02/05107 | 1/2002 |
| WO | WO 2009/076178 | 6/2009 |

\* cited by examiner

METHOD FOR SETTING UP AN UNINTERRUPTED COMMUNICATION CONNECTION AND COMMUNICATION DEVICE

BACKGROUND OF THE INVENTION

1. Field of the Invention

The present invention relates to industrial automation networks and, more particularly, to a method for setting up an uninterrupted communication connection.

2. Description of the Related Art

Industrial automation systems are used to monitor, control and regulate technical processes, particularly in the field of production, process and building automation, and to enable operation of control devices, sensors, machinery and industrial plants which is intended to be performed autonomously and independently from human interventions. Due to the constantly increasing importance of information technology for automation systems comprising numerous networked control and computer units, methods for reliably providing functions distributed over an automation system are becoming increasingly important for providing monitoring, control and regulating functions.

Interruptions of communication connections between computer units of an industrial automation system or automation devices can result in an unwanted or unnecessary repetitive transmissions of a service request. These repetitive transmissions cause additional use of communication connections of the industrial automation system, which may result in further system failures or faults. Furthermore, un-transmitted messages or incompletely transmitted messages may, for example, prevent an industrial automation system from switching to or remaining in a safe operating condition. This condition can ultimately result in an outage of a complete production plant and a costly production stoppage. In industrial automation systems, one particular problem is regularly caused by message traffic with comparatively numerous but relatively short messages, as a result of which the above problems are exacerbated.

EP 1 770 458 A2 discloses an industrial automation system with at least one programmable logic controller module, where a configuration unit is provided for configuring the control unit and for announcing its availability on a communication network. The configuration unit allocates a unique communication network address, such as an IPv6 address, to the control unit. In this way, the control unit can be automatically placed into service.

European patent application EP 14171757.9 discloses a method for allocating communication network addresses for network participants of a segmented network with a plurality of subnetworks. Here, the subnetworks are each connected via a subnetwork router to a collecting network that connects them. A common address range is determined locally by the subnetwork routers via the exchange of router messages distributed over the collecting network, and communication network addresses are defined for the network participants within the address range.

Particularly in IPv6 communication networks, changes of communication network addresses in a network renumbering represent essentially envisaged processes. Furthermore, IPv6 communication devices can simultaneously manage a plurality of allocated communication network addresses that each have a defined service life. In the case of an existing protected connection between a communication device within an industrial communication network and a communication device outside the industrial communication network, a change of a communication network address of one of the two communication devices may result in a temporary interruption, which may lead to further malfunctions.

European patent application EP 14185907.4 discloses a method for setting up a protected communication connection to a communication device connected to an industrial automation system, in which a protected communication connection is set up between a first communication device and a second communication device via an unprotected first subnetwork. The protected communication connection may be, for example, a Virtual Private Network Tunnel. The second communication device is additionally connected to a protected second subnetwork that is allocated to the industrial automation system. A monitoring unit allocated to the second communication device checks whether a new communication network address allocated to the second communication device for a connection to the first subnetwork becomes valid.

In accordance with the method described in European patent application EP 14185907.4, in the case of a change of a communication network address allocated to the second communication device for a connection to the first subnetwork and a still-existing protected communication connection between the first and the second communication device, the monitoring unit transmits an address change notification via the existing protected communication connection to the first communication device. Upon receiving an address change notification, the first communication device initiates a set-up of an additional protected communication connection between the first and the second communication device via a first subnetwork. As soon as the additional protected communication connection is set up and configured, the first communication device completes a switchover from the existing protected communication connection to the additional protected communication connection.

SUMMARY OF THE INVENTION

It is an object of the present invention to provide suitable devices and a method that is simple to implement for setting up an uninterrupted communication connection, where the method enables essentially continuous operation in the event of changes of communication network addresses during existing connections.

This and other objects and advantages are achieved according in accordance with the invention by providing a communication device and method for setting up an uninterrupted communication connection to a communication device which is allocated to an industrial automation system, where a first communication connection is set up between a first communication device and a second communication device according to a transmission control protocol using a first communication network address allocated to the first communication device. Both the first communication device and the second communication device or only one of the two communication devices may be allocated to the industrial automation system. Based on a name resolution protocol, a monitoring unit allocated to the first communication device performs a check to determine whether a second communication network address allocated to the first communication device becomes valid. The monitoring unit may be, for example, integrated into the first communication device, into a router allocated to the first communication device or into a gateway allocated to the first communication device.

In accordance with the invention, in the case of an allocation of a second valid communication network address and an existing first communication connection, the monitoring unit initiates a set-up of an additional second communication connection between a transport and switching function unit allocated to the first communication device and the second communication device. The first communication connection and the second communication connection may be, for example, set up in accordance with a connection-oriented connection control protocol, in particular in accordance with the Transmission Control Protocol (TCP). The transport and switching function unit preferably comprises a multipath TCP functionality. The transport and switching function unit allocated to the first communication device sets up the second communication connection using the second communication network address allocated to the first communication device. The first communication connection is cleared (i.e., torn down or removed) if the second communication connection is successfully set up.

The method in accordance with the invention enables a transparent, collision-free use of multipath TCP/IP connections in a network renumbering via control programs running on both communication devices, without the need for additional measures at application or session level or measures to set up protected communication connections, such as Virtual Private Network (VPN) tunnels. In particular, provider-aggregatable IPv6 addresses can be used here, so that there is no need for provider-independent IPv6 addresses that are not necessarily available to every user. In addition, the method in accordance with the invention can be performed relatively easily, and can be integrated into existing infrastructure through the use of established concepts, such as Multipath TCP and Dynamic Domain Name System (Dynamic DNS).

In accordance with a preferred embodiment of the method in accordance with the invention, the transport and switching function unit is configured to process an Internet protocol stack. In particular, the transport and switching function unit can be integrated into the first communication device and can access a communication network adapter of the first communication device via a first communication network adapter driver. The communication network adapter may comprise, for example, a transceiver unit and a control unit for coordinating access to a communication medium.

In accordance with an alternative embodiment of the method in accordance with the invention, the transport and switching function unit can be integrated into a router allocated to the first or second communication device or into a gateway allocated to the first or second communication device. Here, the router or gateway acts as a proxy for the respective communication device and manages, for example, multipath TCP connections for the communication device that are extended by the router or gateway as simple connections to the communication device.

In accordance with a further embodiment of the present invention, a name resolution unit is advantageously allocated to the monitoring unit, where the name resolution unit continuously checks, based on a name resolution service, whether a second communication network address allocated to the first communication device becomes valid. The name resolution service is provided, for example, by at least one Domain Name System Server. Here, the name resolution unit is a DNS client that preferably monitors a change of an IPv6 prefix allocated to the first communication device. In the event of a change of the IPv6 prefix, the monitoring unit can thus initiate the set-up of the additional second communication connection.

In a particularly preferred embodiment, the second communication device is essentially configured in the same way as the first communication device. The first communication connection is set up using a first communication network address allocated to the second communication device. Here, a monitoring unit allocated to the second communication device furthermore checks whether a second communication network address allocated to the second communication device becomes valid and, in the event of an address change or validity change, initiates a set-up of an additional second communication connection. Furthermore, in the event of an address change or validity change, a transport and switching function unit allocated to the second communication device sets up the second communication connection using the second communication network address allocated to the second communication device.

The monitoring unit allocated to the first communication device preferably checks, only in the case of a set-up of the first communication connection initiated by the first communication device, whether a second communication network address allocated to the first communication device or a second communication network address allocated to the second communication device becomes valid and, where appropriate, initiates a set-up of an additional second communication connection. In the same way, the monitoring unit allocated to the second communication device advantageously checks, only in the event of a set-up of the first communication connection initiated by the second communication device, whether a second communication network address allocated to the first communication device or a second communication network address allocated to the second communication device becomes valid and, where appropriate, initiates a set-up of an additional second communication connection. In accordance with an alternative embodiment of the present invention, the monitoring unit that is allocated to the active communication device initiating the first communication connection can also be notified by the monitoring unit that is allocated to the respective other passive communication device of an address change or validity change affecting the passive communication device.

It is also an object of the invention to provide a communication device that performs the method in accordance with the disclosed embodiments, where the communication device has at least one transceiver unit and at least one control unit for coordinating access to a communication medium. The communication device in accordance with the invention furthermore comprises a monitoring unit for checking, based on a name resolution protocol, whether a new or additional communication network address allocated to the communication device becomes valid. In the case of an allocation of a new or additional valid communication network address and an existing communication connection to a selected communication device, the monitoring unit is configured to initiate a set-up of an additional communication connection between a transport and switching function unit allocated to the communication device and the selected communication device. In addition, the communication device in accordance with the invention comprises a transport and switching function unit that is configured to set up the additional communication connection using the new or additional communication network address allocated to the communication device and to clear (i.e., tear down or remove) the previously existing communication connection if the additional communication connection is successfully set up.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is described in detail below based on an example embodiment with reference to the drawings, in which.

DETAILED DESCRIPTION OF THE EXEMPLARY EMBODIMENTS

Figure 1:
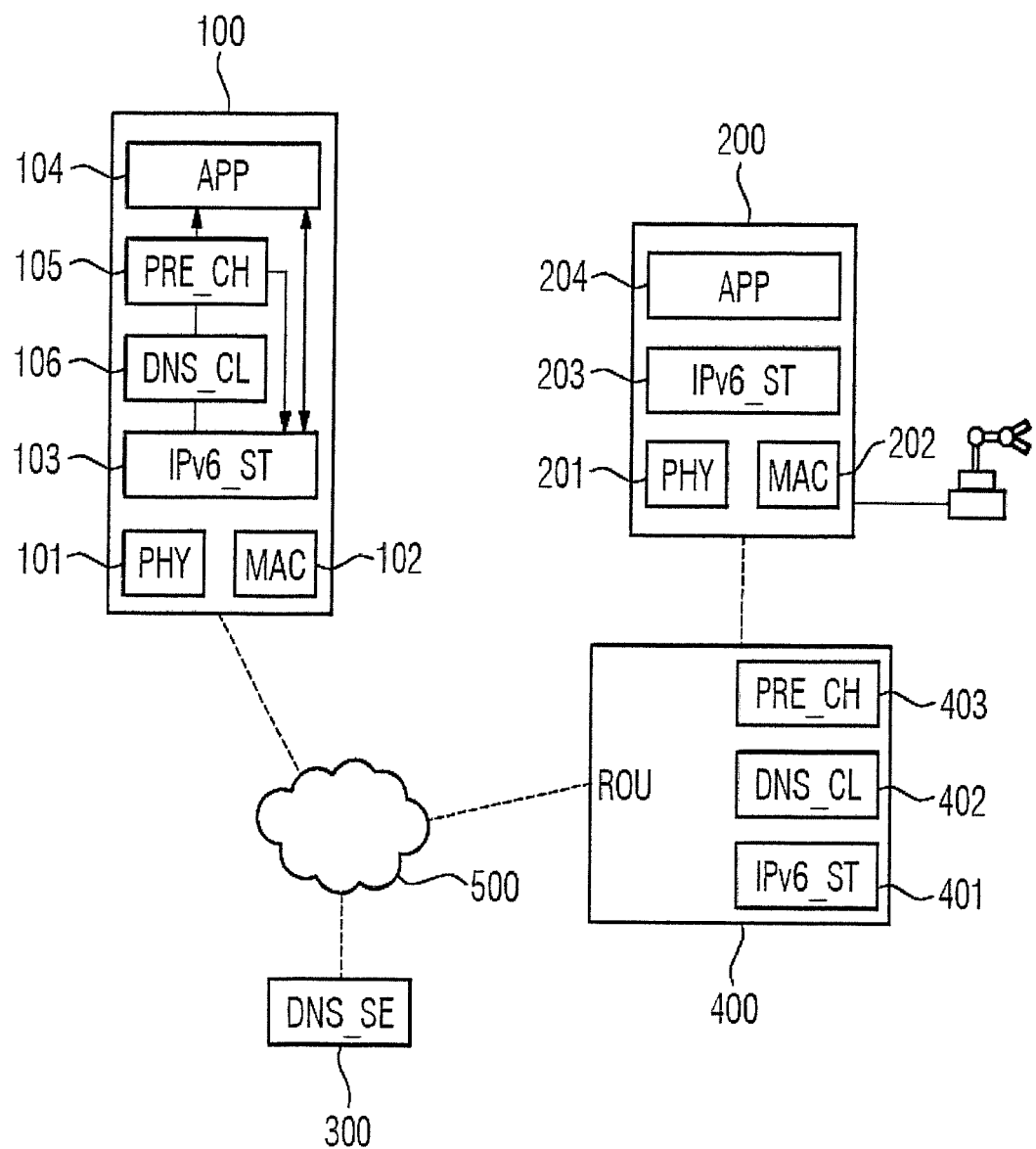
FIG. 1 shows an industrial automation system with an engineering system as a starting point of a communication connection and an automation device as the end point of the communication connection.

With reference to the industrial automation system depicted in FIG. 1 and in accordance with the present exemplary embodiment, the industrial automation system comprises at least one engineering system 100 for planning and monitoring automation devices, an exemplary automation device 200, a Domain Name System (DNS) server 300 and a router 400 allocated to the automation device 200. The engineering system 100, the automation device 200, the DNS server 300 and the router 400 are interconnected via an industrial communication network 500.

The engineering system 100 comprises a communication device with a transceiver unit 101 implemented via a PHY function unit, a control unit 102 implemented via a MAC function unit for coordinating access to a communication medium, and a monitoring unit 105 for checking, based on a name resolution protocol, whether a new or additional IPv6 address allocated to the engineering system 100 becomes valid. For this purpose, a DNS client 106 is allocated to the monitoring unit 105, where the client checks continuously, based on a name resolution service provided by the DNS server 300, whether a new IPv6 address allocated to the engineering system becomes valid, and notifies the monitoring unit 105 accordingly.

The communication device of the engineering system 100 furthermore comprises a transport and switching function unit 103 for processing a TCP/IP protocol stack, where the switching function unit 103 includes a multipath Transmission Control Protocol (TCP) functionality and provides a connection-oriented transmission control protocol/Internet protocol (TCP/IP protocol) for at least one control program 104 executing on the engineering system 100. The transport and switching function unit 103 accesses the transceiver unit 101 and the control unit 102 via a communication network adapter driver to coordinate communication medium access.

The automation device 200 may be, for example, a programmable logic controller or a field device and, in the present example embodiment, comprises a communication device which is essentially designed and configured in the same way as the communication device of the engineering system 100. In particular, the communication device of the automation device 200 comprises a transceiver unit 201 implemented via a PHY function unit, a control unit 202 implemented via a MAC function unit for coordinating access to a communication medium, and also a transport and switching function unit 203 for processing a TCP/IP protocol stack. The transport and switching function unit 203 provides a connection-oriented TCP/IP transport service for at least one control program 204 executing on the automation device 200.

In the present exemplary embodiment, a first communication connection is set up between the engineering system 100 and the automation device 200 in accordance with the Transmission Control Protocol using a first communication network address allocated to the engineering system 100 and a first communication network address allocated to the automation device 200. In the case of a set-up of the first communication connection being initiated by the engineering system 100, the monitoring unit 105 allocated to the engineering system 100 checks continuously whether a second IPv6 address allocated to the engineering system 100 or a second IPv6 address allocated to the automation device 200 becomes valid.

In the event of allocation of a second valid IPv6 address, particularly based on an IPv6 prefix change, and an existing first communication connection, the monitoring unit 105 of the engineering system 100 initiates a set-up of an additional second communication connection between the transport and switching function unit 103 of the engineering system 100 and the transport and switching function unit 203 of the automation device 200. The second communication connection is also set up in accordance with the Transmission Control Protocol. The transport and switching function unit 103 allocated to the engineering system 100 sets up the second communication connection using the second IPv6 address allocated to the engineering system 100 or the automation device 200. If the second communication connection is successfully set up, the first communication connection is cleared (i.e., torn down or removed) by the transport and switching function unit 103 of the engineering system 100.

Conversely, in the case of a set-up of the first communication connection by the automation device 200, a monitoring unit allocated to the automation device 200 checks whether a second communication network address allocated to the engineering system 100 or a second communication network address allocated to the automation device 200 becomes valid, and initiates a set-up of the additional second communication connection in the event of an address change or validity change.

If the transport and switching function unit 203 of the automation device has no multipath TCP functionality, or if the automation device 200 does not comprise its own monitoring unit or a DNS client, corresponding functions can be transferred into the router 400 allocated to the automation device 200. For this purpose, the router 400 preferably comprises a transport and switching function unit 401 with multipath TCP functionality, a monitoring unit 402 as described above, and a DNS client 403. The router 400 can thus, in particular, terminate multipath TCP connections for the automation device 200 and can forward simple TCP connections to the automation device 400 or the communication device of the automation device 200. Functions of the engineering system 100 and its communication device can also be transferred in a corresponding manner into a router allocated to the engineering system 100 or into a gateway. The router or gateway then acts as a proxy for the engineering system 100 or for the automation device 200.

Figure 2:
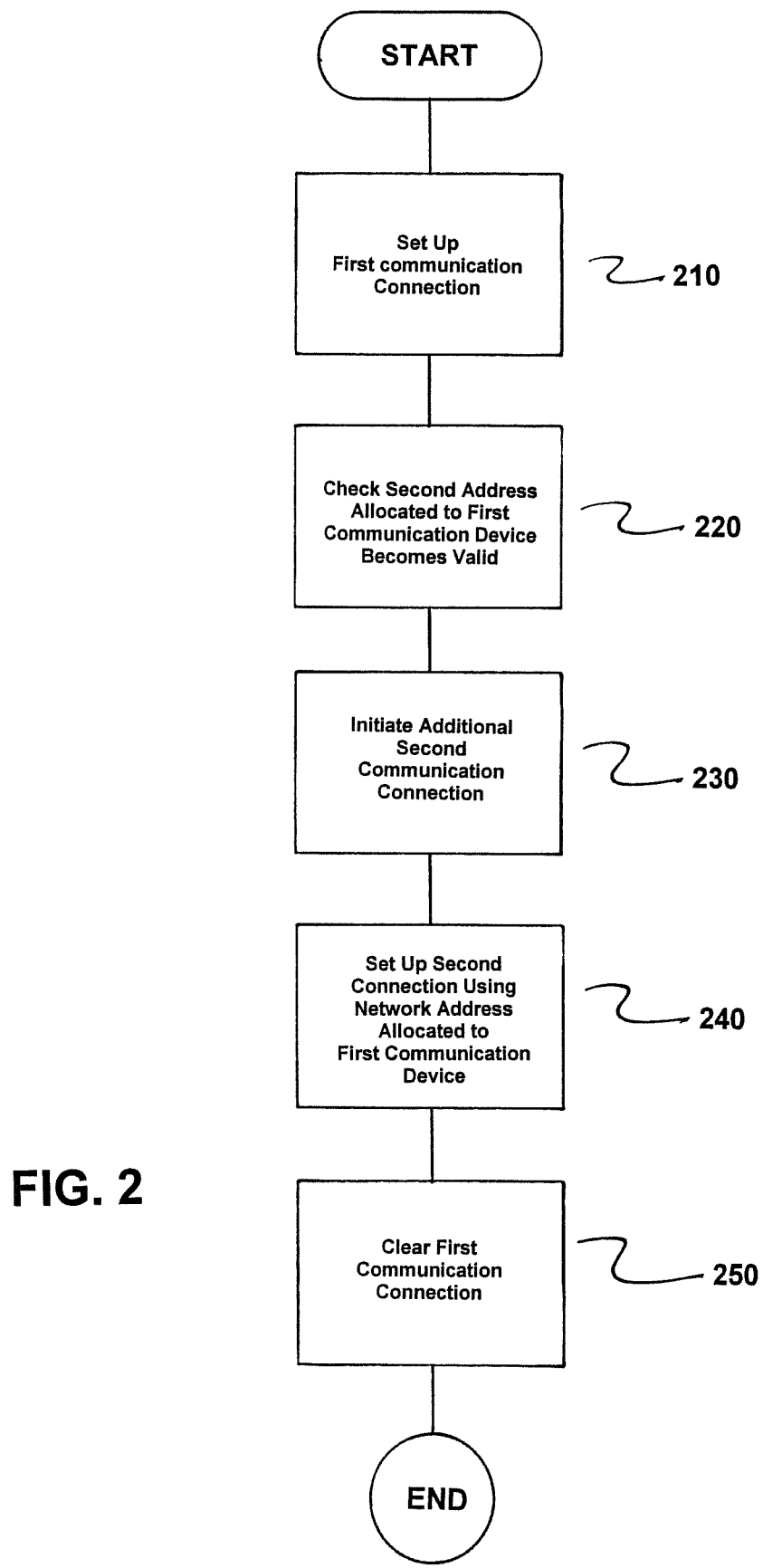
FIG. 2 is a flowchart of the method in accordance with the invention.

FIG. 2 is a flowchart of the method for setting up an uninterrupted communication connection with a communication device allocated to an industrial automation system. The method comprises setting up a first communication connection between a first communication device and a second communication device in accordance with a transmission control protocol using a first communication network address allocated to the first communication device, as indicate in step 210.

Next, based on a name resolution protocol, a monitoring unit allocated to the first communication device, checks whether a second communication network address allocated to the first communication device becomes valid, as indicated in step 220.

The monitoring unit now initiates a set-up of an additional second communication connection between a transport and switching function unit allocated to the first communication device and the second communication device in cases of an allocation of a second valid communication network address and an existing first communication connection, as indicated in step 230.

Next, the transport and switching function unit allocated to the first communication device sets up the second communication connection using the communication network address allocated to the first communication device, as indicated in step 240.

The first communication connection is now cleared if the second communication connection is successfully set-up, as indicated in step 250.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for setting up an uninterrupted communication connection with a communication device allocated to an industrial automation system including an engineering system, comprising:

setting up a first communication connection between a first communication device and a programmable logic device (PLC) in accordance with a transmission control protocol using a first communication network address allocated to the first communication device;

checking, by a monitoring unit within the engineering system of the industrial automation system allocated to the first communication device, based on a name resolution protocol, whether a second communication network address allocated to the first communication device is valid;

initiating, by the monitoring unit within the engineering system of the industrial automation system a set-up of an additional second communication connection between a transport and switching function unit allocated to the first communication device and the PLC in cases of an allocation of a second valid communication network address and an existing first communication connection;

setting up, by the transport and switching function unit allocated to the first communication device, the second communication connection using the second communication network address allocated to the first communication device; and clearing the first communication connection if the second communication connection is successfully set-up;

wherein the PLC and the first communication device have the same configuration;

wherein the first communication connection is set-up using a first communication network address allocated to the PLC;

wherein a monitoring unit within the engineering system of the industrial automation system allocated to the PLC checks whether a second communication network address allocated to the PLC is valid, and, in an event of at least one of (i) an address change and (ii) a validity change, initiates a set-up of the additional second communication connection;

wherein a transport and switching function unit allocated to the PLC, in the event of at least one of (i) the address change and (ii) the validity change, sets up the second communication connection using the second communication network address allocated to the PLC; and wherein the monitoring unit of the engineering system of the industrial automation system allocated to the first communication device checks, only in the case of a set-up of the first communication connection initiated by the first communication device, whether a second communication network address allocated to the first communication device or a second communication network address allocated to the PLC is valid, and, in the event of at least one of (i) the address change and (ii) the validity change, initiates the set-up of the additional second communication connection.

2. The method as claimed in claim 1, wherein at least one of the first communication connection and the second communication connection is set-up in accordance with a connection-oriented connection control protocol.

3. The method as claimed in claim 2, wherein at least one of the first communication connection and the second communication connection is set-up in accordance with a Transmission Control Protocol (TCP).

4. The method as claimed in claim 3, wherein the transport and switching function unit has a multipath TCP functionality.

5. The method as claimed in claim 1, wherein the transport and switching function unit is configured to process an Internet protocol stack.

6. The method as claimed in claim 1, wherein the transport and switching function unit is integrated into one of (i) the first communication device, (ii) into a router allocated to the first communication device or (iii) a gateway allocated to the first communication device.

7. The method as claimed in claim 1, wherein the transport and switching function unit is integrated into the first communication device, and wherein the transport and switching function unit accesses a communication network adapter of the first communication device via a communication network adapter driver.

8. The method as claimed in claim 7, wherein the communication network adapter comprises a transceiver unit and a control unit for coordinating access to a communication medium.

9. The method as claimed in one of claim 8, wherein a name resolution unit is allocated to the monitoring unit of the engineering system, said name resolution unit checking continuously, based on a name resolution service, whether the second communication network address allocated to the first communication device is valid.

10. The method as claimed in claim 9, wherein the name resolution service is provided by at least one Domain Name System (DNS) Server (DNS), and wherein the name resolution unit is a DNS client.

11. The method as claimed in claim 10, wherein the DNS client monitors a change of an IPv6 prefix allocated to the first communication device.

12. The method as claimed in claim 11, wherein, in an event of a change of the IPv6 prefix, the monitoring unit within the engineering system of the industrial automation system initiates the set-up of the additional second communication connection.

13. The method as claimed in claim 1, wherein the monitoring unit within the engineering system of the industrial automation system is integrated into one of (i) the first communication device, (ii) a router allocated to the first communication device or (iii) a gateway allocated to the first communication device.

14. The method as claimed in claim 1, wherein the monitoring unit of the engineering system of the industrial automation system allocated to the PLC checks, only in the case of a set-up of the first communication connection initiated by the first communication device, whether at least one of (i) a second communication network address allocated to the first communication device and (ii) a second communication network address allocated to the PLC is valid, and, in the event of at least one of (i) the address change and (ii) the validity change, initiates the set-up of the additional second communication connection.

15. The method as claimed in claim 1, wherein at least one of (i) the first communication device and (ii) the PLC is allocated to the industrial automation system.

16. A communication device within an engineering system of an industrial automation system, the communication device comprising:
   at least one transceiver unit;
   at least one control unit for coordinating access to a communication medium; and
   a monitoring unit for checking, based on a name resolution protocol, whether at least one of (i) a new communication network address and (ii) an additional communication network address allocated to the communication device of the engineering system of the industrial automation system is valid, the monitoring unit being configured to initiate a set-up of an additional communication connection between at least one of (i) a transport and switching function unit allocated to the communication device and a selected programmable logic controller (PLC) in cases of the allocation of at least one of (i) a new valid communication network address and (ii) an additional valid communication network address and an existing communication connection to the communication device;
   wherein the transport and switching function unit is configured to set-up the additional communication connection using at least one of (i) the new communication network address and (ii) the additional communication network address allocated to the communication device, and configured to clear a previously existing communication connection if the additional communication connection is successfully set-up;
   wherein the PLC and the communication device have the same configuration;
   wherein the first communication connection is set-up using a first communication network address allocated to the PLC;
   wherein a monitoring unit within the engineering system of the industrial automation system allocated to the PLC checks whether a second communication network address allocated to the PLC is valid, and, in an event of at least one of (i) an address change and (ii) a validity change, initiates a set-up of the additional second communication connection;
   wherein a transport and switching function unit allocated to the PLC, in the event of at least one of (i) the address change and (ii) the validity change, sets up the second communication connection using the second communication network address allocated to the PLC; and
   wherein the monitoring unit of the engineering system of the industrial automation system allocated to the communication device checks, only in the case of a set-up of the first communication connection initiated by the communication device, whether a second communication network address allocated to the communication device or a second communication network address allocated to the PLC is valid, and, in the event of at least one of (i) the address change and (ii) the validity change, initiates the set-up of the additional second communication connection.

* * * * *